Dec. 12, 1967  E. C. HERNDON ET AL  3,357,257
GAS SAMPLING AND DETECTING SYSTEM
Filed Jan. 28, 1966
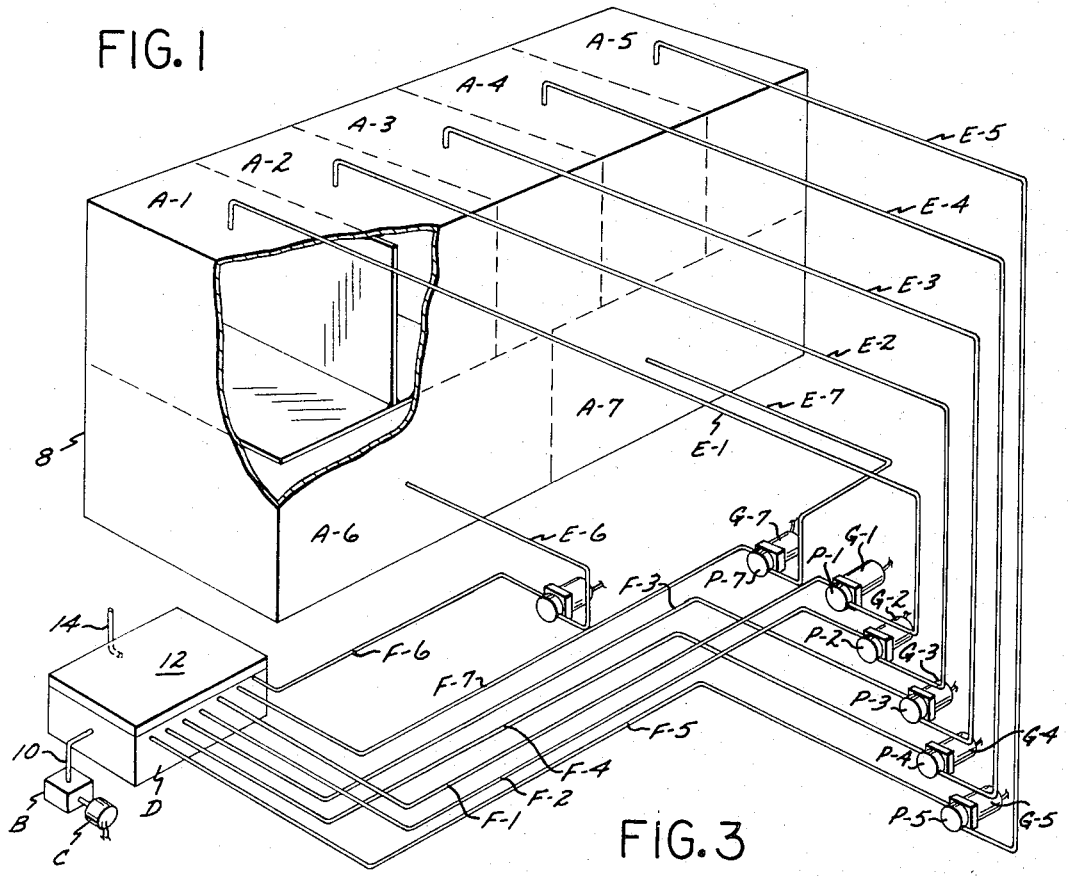
FIG. 1
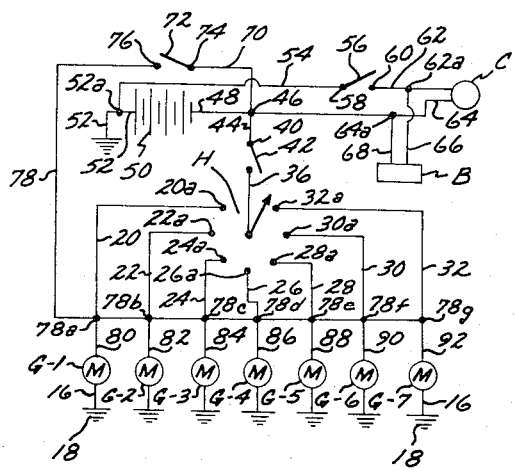
FIG. 2
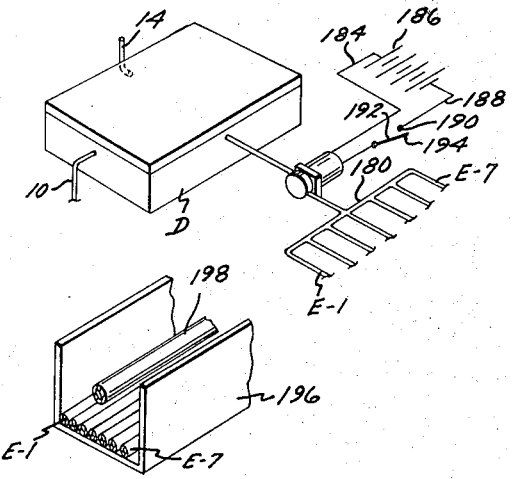
FIG. 3
FIG. 4
INVENTORS.
ELDON C. HERNDON
ROBERT F. DUREE
WILLIAM A. THRALLS
BY William C. Babcock
ATTORNEY

United States Patent Office 3,357,257
Patented Dec. 12, 1967

3,357,257
GAS SAMPLING AND DETECTING SYSTEM
Eldon C. Herndon, Fullerton, Calif., Robert F. Du Ree, 6519 Loma Vista Ave., Bell, Calif. 90201, and William A. Thralls, Hacienda Heights, Calif.; said Herndon and said Thralls assignors to said Du Ree
Filed Jan. 28, 1966, Ser. No. 523,709
7 Claims. (Cl. 73—421.5)

The present invention relates generally to the field of detecting devices, and more particularly to a system for detecting leakage of a gas not common to the ambient atmosphere from a position remote from the location thereof.

In the storage of perishable foods, such foodstuffs are frequently stored in refrigerated compartments, each of which is cooled by sepaarte expansion coils contained therein. Cooling of these coils is accomplished by the compression and expansion of refrigerant gases such as ammonia, Freon, or the like. As is well known, gases of this type have a pronounced odor, and if allowed to collect to any extent in refrigerated compartments, will contaminate the foodstuffs stored therein. Accordingly, it is most desirable to know at the earliest possible time of the presence of a gas leak in a refrigerated compartment. The desirability of detecting gas leaks at an early date is not limited to refrigerated compartments, but is also desirable with regard to various confined spaces utilized in oil refineries, chemical plants and other manufacturing installations.

During the past few years many electrically operated devices adapted to be carried from place to place have been devised and marketed and used to determine whether a leakage of a gas not common to the ambient atmosphere is occurring. Although such devices are useful for their intended purpose, heretofore there has been no way to periodically check for gas leaks in confined spaces from a location remote therefrom.

A major object in devising the present invention is to provide a gas detecting system which may be utilized with an already existing electrically operated gas detecting device, either continuously or periodically, to check for gas leaks in one or more confined spaces from a predetermined location remote therefrom.

Another object of the invention is to provide a gas detecting system that is of simple mechanical structure, can be fabricated from standard, commercially available materials, is easy to install, and due to the low production cost thereof should enjoy widespread acceptance.

These and other objects and advantages of the invention will become apparent from the following description thereof, and from the accompanying drawing illustrating the same, in which:

FIGURE 1 is a perspective view of gas detecting systems installed in conjunction with a plurality of compartments to detect the presence of a gas leak in any one of said compartments;

FIGURE 2 is a diagrammatic view of the wiring system shown in FIGURE 1;

FIGURE 3 is a perspective view of a modified form of the system shown in FIGURE 1; and FIGURE 4 is a fragmentary perspective view of a heated trough used in holding conduits leading from refrigerated compartments.

Referring now to FIGURE 1 of the drawing, a building structure 8 is shown in which a number of compartments A–1, A–2, A–3, A–4, A–5, A–6 and A–7 are provided in which a leakage of a gas not common to the ambient atmosphere may occur from a source not shown.

An electrically operated gas detecting unit B is provided, as shown in FIGURES 1 and 2, that may be any one of the types manufactured by Minneapolis-Honeywell, General Electric, or Bacharach Company, which includes an air pump (not shown) driven by an electric motor C (FIGURE 2). The suction of the pump (not shown) in the gas detecting unit B is connected to a first conduit 10 through which a stream of air and any contaminating gas mixed therewith may be drawn, with the air stream then being subjected to a detecting action by the unit B. If a contaminated gas is present in the air stream, an alarm is rendered by the unit B.

The conduit 10 is connected to a box D that is preferably fitted with a removable cover 12. The interior of box D is vented to the ambient atmosphere by a vent tube 14, as shown in FIGURE 1. A number of air pumps P–1, P–2, P–3, P–4, P–5, P–6 and P–7 are provided, the suctions of which are connected by second conduits E–1, E–2, E–3, E–4, E–5, E–6, and E–7 that lead to the interior of compartments A–1 to A–7, respectively. The discharge of pumps P–1 to P–7 are connected to third conduits F–1, F–2, F–3, F–4, F–5, F–6 and F–7, respectively, that extend to the box D and are in communication with the interior thereof. Pumps P–1 to P–7 are driven by electric motors G–1, G–2, G–3, G–4, G–5, G–6 and G–7, respectively.

The motors G–1 to G–7 inclusive, each have one terminal thereof connected by an electrical conductor 16 to ground 18. The second terminals of motors G–1 to G–7 are connected by electrical conductors 20, 22, 24, 26, 28, 30 and 32 to contacts 20a, 22a, 24a, 26a, 28a, 30a and 32a respectively, of a rotary electrical switch H. Switch H includes a pivotally supported blade 34 that can selectively engage any one of the contacts 20a to 32a. Blade 34 is connected by an electrical conductor 36 to a contact 38 of a switch 40 that includes a blade 42.

Blade 42 is connected by an electrical conductor 44 to a junction 46 from which another electrical conductor 48 extends to one terminal of a source 50 of electrical energy. The other terminal of source 50 is connected by a conductor 52 to ground 18. From a junction point 52a in conductor 52 an electrical conductor 54 leads to a blade 56 of a single pole, single throw switch 58.

The blade 58 may be moved into engagement with a contact 60 from which an electrical conductor 62 extends to one terminal of an electric motor C. The other terminal of motor C is connected by an electric conductor 64 to junction 46. Electrical conductors 66 and 68 extend from junction points 62a and 64a in conductors 62 and 64, respectively, to the electrically operated gas detecting unit B.

An electrical conductor 70 extends from junction 46 to a blade 72 of a single pole, single throw switch 74. Blade 72 can be moved to engage a contact 76 from which a conductor 78 extends that has junction points 78a, 78b, 78c, 78d, 78e, 78f and 78g therein. Junction points 78a to 78g inclusive are connected by electrical conductors 80, 82, 84, 86, 88, 90, and 92 to conductors 20, 22, 24, 26, 28, 30 and 32, respectively, as can best be seen in FIGURE 2.

Operation of the gas detecting system in conjunction with the above described electrical circuit is quite simple. The switch 58 is first placed in the closed position to electrically energize the motor C and gas detecting unit B. Air is thereafter drawn from the interior of box D through conduit 10 to unit B to be sampled for the presence of a gas not normally present in the ambient atmosphere.

If it is desired to test all of the compartments A–1 to A–7 concurrently for a gas leak, switch 40 is placed in the open position and switch 74 in the closed position. An electric circuit is then completed from the source 50 of electrical energy to the motors G–1 to G–7 inclusive, and the pumps P–1 to P–7 are actuated to draw air and any gas contaminant from the compartments A–1 to A-7, respectively. The withdrawn air and any gas contaminants contained therein are discharged as seven separate streams into the box D through the conduits F-1 to F-7.

The streams of air and any gas that may be present mix in the box D, and a portion thereof is withdrawn through the conduit 10 to the unit B, due to the action of motor C, for gas detection purposes. If gas is present in this test withdrawal, the unit B emits an alarm which may be either audible or visual, or both. Those portions of the seven streams of air and gas discharged into box D which do not flow therefrom through conduit 10, pass from the box into the ambient atmosphere through the vent tube 14.

If it is desired to test any particular one of the compartments A-1 to A-7 for a gas leak, the switch 74 is opened, and the switch 40 closed. Thereafter, the blade 34 is pivoted to engage a particular one of the contacts 20a to 32a that will complete an electric circuit to the motors G-1 to G-7, respectively, associated with the particular compartment to be tested.

For example, if the compartment A-4 is to be tested for the presence of a gas leak, the blade 34 would be pivoted to engage the contact 26a, and as can be seen in FIGURE 2, an electrical circuit would be completed to the motor G-4. Motor G-4 drives pump P-4, which draws air and any gas contaminant contained therein from compartment A-4 to discharge the same into box D through conduit F-4.

A portion of the air and any gas contaminant present in compartment A-4 is withdrawn from box D through conduit 10 and subjected to the action of unit B. If any gas is present in this test withdrawal, the unit B will give an alarm thereof. By rotating the blade 34 incrementally to cause it to engage each of the contacts 20a, 22a, 24a, 26a, 28a, 30a and 32a, the compartments A-1 to A-7, respectively, may be tested sequentially for the presence of any gas which may be contained therein.

A modification of the system above described is shown in FIGURE 3, in which the pumps P-1 to P-7 are replaced by a single pump P and a single electric motor G. The discharge of pump P is connected to conduit F, with the suction being connected to a conduit E that extends to a manifold 180. Manifold 180 is connected to the conduits E-1 to E-7. The terminals of motor G are connected to two electrical conductors 182 and 184, and the latter conductor is connected to one terminal of a source of electricity 186. The other terminal of source 186 is connected by a conductor 188 to a contact 190 forming a part of an electric switch 192 that includes a blade 194.

As also shown in FIGURE 3, the blade 194 is connected to the electrical conductor 182. When the switch 192 is placed in the closed position, motor G is energized and drives the pump P. The pump P concurrently draws air and any contaminating gases mixed therewith from the compartments A-1 to A-7 inclusive and discharges the same through the conduits F into the box D. A portion of the air, together with any contaminating gases in the box D is drawn therefrom through the conduit 10 into the gas detecting unit B, and if a contaminating gas is present, this unit gives an alarm to that effect.

It will be apparent that in this modified form of the system, an alarm indicating the presence of a gas leak in one of the compartments A-1 to A-7 will be given, but without indicating the specific compartment in which the leak occurs. Actual determination of the location of the leak requires further investigation by physical inspection or by taking a portable gas detecting unit to each of the compartments until the leak is found.

In those situations where the compartments A-1 to A-7 are refrigerated, the air and any contaminating gases present therein that is withdrawn therefrom may be exceedingly cold and cause the conduits E-1 to E-7 to freeze up. To eliminate this possibility, the conduits E-1 to E-7 may be disposed in side-by-side relationship in a trough 196, as shown in FIGURE 4, with an elongate heating element 198 being disposed in the trough adjacent thereto. Heating element 198 may be a tube through which a heat-emitting liquid is pumped, or may be an elongate resistance element that radiates sufficient heat to conduits E-1 to E-7 to prevent obstruction thereof by frozen condensate, or the like.

In referring to the use of the systems described herein they have been illustrated as being applied to compartments A-1 to A-7, which compartments define confined spaces therein. It will be apparent that in its broader aspects the systems are not restricted to the use of compartments but any specific zone or confined space into which gases may leak which are undesirable either from an odor standpoint or that of an explosive or toxic nature.

Thus, these systems are equally applicable for use in refrigeration plants as well as in oil refineries, chemical plants, and other commercial installations in which leakage of gas having undesirable physical properties may be determined and the leaking piece of equipment repaired.

Although the present invention is fully capable of achieving the objects and providing the advantages hereinbefore mentioned, it is to be understood that it is merely illustrative of the presently preferred embodiment thereof and we do not mean to be limited to the details of construction herein shown and described, other than as defined in the appended claims.

We claim:

1. A gas detecting system for use in determining the presence of the leakage of a gas not common to the ambient atmosphere in any one of a plurality of confined spaces, including:
   (a) an enclosed box, the interior of which is vented to the ambient atmosphere;
   (b) a first conduit connected to the interior of said box;
   (c) second conduit means connected to the interior of said box;
   (d) electrically operated gas detecting means for detecting gases not common to the ambient atmosphere, which means renders an alarm when said gas is present;
   (e) an electrically operated air pump, the suction of which is connected to said first conduit, with the discharge thereof being connected to said gas detecting means;
   (f) first electrically operated air pump means, the discharge of which is connected to said second conduit means;
   (g) a plurality of third conduits connected to the suction of said first electrically operated air pump means, with each of said third conduits being in communication with a separate one of said confined spaces; and
   (h) an electrical circuit connected to a source of electric power, said gas detecting means, said pump and said first pump means, with said first pump means discharging streams of air and any gas which may have leaked thereinto from said confined spaces to the interior of said box where said streams combine to define a mixture of air and any of said gas that may be comingled therewith, and with a first portion of said mixture being withdrawn from said box by said pump and delivered to said gas detecting means for detection of any of said gas in said first portion, with the balance of said mixture in said box being progressively vented to the atmosphere as the pressure of said mixture in said box rises above the pressure of the ambient atmosphere.

2. A gas detecting system as defined in claim 1 wherein said first electrically operated air pump means comprises a single electric motor-driven air pump, the discharge of which is connected to said second conduit, which system further includes:

(e) a manifold connected to the suction of said pump and to said third conduits.

3. A gas detecting system as defined in claim 1 wherein said first electrically operated air pump means comprise a plurality of electric motor-driven air pumps, the suctions of which are connected to said third conduits with the discharges thereof being connected to said second conduit means.

4. A gas detecting system as defined in claim 3 wherein said second conduit means comprise a plurality of second conduits connecting the discharges of said plurality of electric motor-driven pumps to the interior of said box.

5. A gas detecting system as defined in claim 3 which further includes:
  (i) electric switching means forming a part of said electric circuit for selectively actuating any desired one of said electric motor-driven air pumps to draw air and any contaminating gas from a particular one of said confined spaces and discharge the same to said box.

6. A gas detecting system as defined in claim 3 which further includes:
  (i) electric switching means forming a part of said electric circuit for selectively actuating any desired one of said electric motor-driven air pumps to draw air and any contaminating gas from a particular one of said confined spaces and discharge the same to said box; and
  (j) second electric switching means forming a part of said electric circuit for concurrently actuating all of said electric motor-driven air pumps to draw air and any contaminating gases from all of said confined spaces and discharge the same to said box.

7. A gas detecting system as defined in claim 3 which further includes:
  (i) means for heating said second conduit means and said third conduits to maintain the same at a desired temperature.

References Cited
UNITED STATES PATENTS 3,043,145   7/1962   Hoffman _____ 73—421.5

FOREIGN PATENTS 996,361   6/1965   Great Britain.

LOUIS R. PRINCE, *Primary Examiner.*

S. C. SWISHER, *Assistant Examiner.*